(12) United States Patent
Monpeurt et al.

(10) Patent No.: US 11,747,134 B2
(45) Date of Patent: Sep. 5, 2023

(54) OPTICAL COMPONENT FOR AN ATR INTERFEROMETRIC IMAGING DEVICE

(71) Applicant: COMMISSARIAT A L'ENERGIE ATOMIQUE ET AUX ENERGIES ALTERNATIVES, Paris (FR)

(72) Inventors: Cyrielle Monpeurt, Grenoble (FR); Gabriel Jobert, Grenoble (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 64 days.

(21) Appl. No.: 17/645,170

(22) Filed: Dec. 20, 2021

(65) Prior Publication Data

US 2022/0196384 A1    Jun. 23, 2022

(51) Int. Cl.
*G01B 9/02* (2022.01)
*F21V 8/00* (2006.01)

(52) U.S. Cl.
CPC ..... *G01B 9/02041* (2013.01); *G01B 9/02049* (2013.01); *G01B 9/02051* (2013.01); *G02B 6/0011* (2013.01)

(58) Field of Classification Search
CPC .......... G01B 9/02041; G01B 9/02049; G01B 9/02051; G02B 6/0011; G01N 21/45; G01N 21/552
See application file for complete search history.

(56) References Cited

U.S. PATENT DOCUMENTS

| 6,175,671 B1 * | 1/2001 | Roberts | G02B 6/12011 385/47 |
| 10,048,441 B1 * | 8/2018 | Mohamed | G02B 6/2804 |
| 10,359,566 B1 * | 7/2019 | Mohamed | H01P 5/188 |
| 2006/0066866 A1 * | 3/2006 | Wang | G01N 21/45 356/481 |

FOREIGN PATENT DOCUMENTS

GB           2 409 034 A        6/2005

OTHER PUBLICATIONS

French Preliminary Search Report dated Aug. 26, 2021 in French Application 20 13817 filed on Dec. 21, 2020, 2 pages (with Engish Translation of Categories of Cited Documents).

(Continued)

*Primary Examiner* — Jonathan M Hansen
(74) *Attorney, Agent, or Firm* — Oblon, McClelland, Maier & Neustadt, L.L.P.

(57) ABSTRACT

An optical component for an attenuated total reflection interferometric imaging device, which includes:
   a planar waveguide, especially delimited by a front face and a rear face parallel to each other;
   an injection zone, comprising two input facets, each extending from a side face of the planar waveguide, configured to separate an initial light beam into two sub-beams each deflected in a respective direction when they enter the planar waveguide; and
   an extraction zone, including two output facets, configured to receive the two sub-beams, and to deflect the same when they exit the planar waveguide, (Continued)

the optical component being configured so that the two sub-beams can interfere with each other after emerging out of the planar waveguide.

15 Claims, 4 Drawing Sheets

(56) References Cited

OTHER PUBLICATIONS

U.S. Appl. No. 17/329,503, filed May 25, 2021, 2021/0377464 A1, Monpeurt, C, et al.
U.S. Appl. No. 17/305,347, filed Jul. 6, 2021, Monpeurt, C, et al.
U.S. Appl. No. 17/644,639, filed Dec. 6, 2021, Monpeurt, C, et al.

* cited by examiner

OPTICAL COMPONENT FOR AN ATR INTERFEROMETRIC IMAGING DEVICE

TECHNICAL FIELD

The invention is directed to the field of attenuated total reflection multi-spectral imaging, and more particularly relates to a component for performing light distribution to the sample and light collection from the sample.

STATE OF PRIOR ART

Attenuated Total Reflection (ATR) imaging is an imaging technique, in which light is brought into a prism adjoined against a sample to be analysed. Light is entirely reflected at an interface between the component and the sample to be analysed. Part of the light however penetrates into the sample to be analysed, in the form of an evanescent wave. Part of this evanescent wave is absorbed by the sample to be analysed. Light returned from the sample to be analysed therefore contains information relating to the absorption by the sample.

In some cases, the sample to be analysed has both highly absorbing compounds and weakly absorbing compounds over a same wavelength range. Absorption by the highly absorbing compounds thereby covers absorption by more weakly absorbing compounds. This situation arises, for example, when the sample comprises a large amount of water molecules and a small amount of third party molecules, whose absorption is negligible relative to the absorption by the water molecules. In such a situation, an image directly based on absorption measurements is not adapted.

To avoid this drawback, an image can be formed, not directly based on absorption measurements, but rather on phase measurements (interferometric imaging). The image made is then a distribution of local values of a phase shift brought by the sample. Imaging based on phase measurements can be implemented using an interferometric device, operating on the principle of a Mach-Zehnder interferometer, and further integrating a means for implementing an attenuated total reflection in a sample. Such a device is described for example in the paper "*Quantitative imaging of cellular adhesion by total internal reflection holographic microscopy*", William M. Ash & al, Applied Optics, December 2009. The device described in this paper has a reference arm, to receive a reference beam that does not interact with the sample, and an object arm, to receive an object beam that interacts with the sample. The object arm includes a prism, adjoined against a sample, to implement attenuated total reflection. The device is relatively complex, as it consists of a large amount of distinct optical components.

Thus there is a need to provide a simpler means to obtain an interferometric image utilising the attenuated total reflection phenomenon.

DISCLOSURE OF THE INVENTION

This objective is achieved with an optical component for an attenuated total reflection interferometric imaging device, which includes:
- a planar waveguide, delimited especially by a front face, a rear face, and side faces, with the front face and the rear face parallel to each other and forming the two largest faces of the planar waveguide;
- an injection zone, comprising two input facets formed in the planar waveguide, said input facets being obliquely tilted relative to the plane of the front and rear faces of the planar waveguide, said input facets each extending from a first side face of the planar waveguide, and said input facets being configured together to separate an initial light beam into two sub-beams each deflected in a respective direction when they enter the planar waveguide; and
- an extraction zone, comprising two output facets formed in the planar waveguide, said output facets being obliquely tilted relative to the plane of the front and rear faces of the planar waveguide, and said output facets being configured to receive the two sub-beams and to deflect the latter when they exit from the planar waveguide;

the optical component being configured so that the two sub-beams can interfere with each other after emerging out of the planar waveguide.

Preferably, but in a non-limiting way, the initial light beam is an infrared light beam, and the planar waveguide is capable of guiding infrared light. The infrared light may include the central wavelength of at least one absorption peak of a chemical or biological component, whose presence is searched for in the sample to be analysed. Advantageously, the optical component is configured to process light at wavelengths used in infrared spectroscopy, that is light belonging to the infrared spectrum, especially mid-infrared. Alternatively, the initial light beam may be a visible light beam, and the planar waveguide is capable of guiding visible light. However, the invention is not limited to any particular wavelength range. Throughout the text, the term "infrared" refers to a part of the light spectrum belonging to a spectral band ranging from 0.78 µm to 50 µm, more preferentially from 2 µm to 14 µm (mid-infrared). Throughout the text, the term "visible" refers to a part of the light spectrum belonging to a spectral band ranging from 0.35 µm to 0.78 µm exclusive.

In use, the initial light beam is injected into the planar waveguide, at the injection zone. The initial light beam impinges on the injection zone by extending partly over a first of the input facets and partly over a second of the input facets. At the first input facet, the initial light beam penetrates the planar waveguide by being refracted in a first direction. At the second input facet, the initial light beam penetrates the planar waveguide by being refracted in a second direction, oriented transversely relative to the first direction. The two input facets thus separate the initial light beam into two sub-beams, which propagate inside the planar waveguide in different directions. The first of the two sub-beams is called the "object beam" and the second of the two sub-beams is called the "reference beam".

The object beam circulates in the planar waveguide, from the injection zone to the extraction zone, by successive reflections on the front and rear faces of the planar waveguide, and with possibly one or more reflections on the side faces of the planar waveguide. During its propagation in the planar waveguide, light of the object beam is only confined along the axis of the planar waveguide thickness. In the other two dimensions of space, propagation in the planar waveguide results in a strong spatial light spreading. Thus, as the successive reflections proceed on the front and rear faces of the planar waveguide, light of the object beam covers an increasingly large surface area on the front face, respectively rear face of the planar waveguide. On the rear face of the planar waveguide, a surface called analysis surface can be defined. This analysis surface corresponds to a coverage surface between the object beam and the rear face of the planar waveguide, after several reflections on the front and rear faces of the planar waveguide. Preferably, the analysis surface corresponds to the last incidence of the object beam on the rear face of the planar waveguide, before reaching the first output facet of the extraction zone. In use, a sample to be analysed is adjoined against the analysis surface. At the analysis surface, light of the object beam interacts with the sample to be analysed, according to the principle of the attenuated total reflection described in introduction. Then, the light of the object beam propagates to the first output facet of the extraction zone, and emerges out of the planar waveguide oriented along a first direction of extraction.

Similarly, the reference beam circulates in the planar waveguide, from the injection zone to the extraction zone, by successive reflections on the front and rear faces of the planar waveguide, and with possibly one or more reflections on side faces of the planar waveguide. Here again, propagation in the planar waveguide results in a strong spatial light spreading. Thus, as successive reflections proceed on the front and rear faces of the planar waveguide, light of the reference beam covers an increasingly large surface area on the front face, respectively rear face of the planar waveguide. On the rear face of the planar waveguide, a surface called reference surface can be defined. This reference surface corresponds to a coverage surface between the reference beam and the rear face of the planar waveguide, after several reflections on the front and rear faces of the planar waveguide. The reference surface and the analysis surface are distinct from each other, with no coverage therebetween. Preferably, the reference surface corresponds to the last incidence of the reference beam on the rear face of the planar waveguide, before reaching the second output facet of the extraction zone. In use, a reference sample is adjoined against the reference surface. The reference sample can consist of a mirror, or a sample consisting of the medium in which the sample to be analysed is immersed, or a sample for which the ATR spectrum is known and/or calibrated, etc. At the reference surface, light of the reference beam interacts with the reference sample, according to the principle of attenuated total reflection. Then, light of the reference beam propagates to the second output facet of the extraction zone, and emerges out of the planar waveguide along a second direction of extraction oriented transversely relative to the first direction of extraction. The first and second directions of extraction intersect at a point downstream of the extraction zone in the light direction of propagation. Thus, the object beam and the reference beam can interfere with each other after circulating in the planar waveguide.

The optical component allows the object beam to interact with the sample to be analysed and the reference beam not to interact with the sample to be analysed. The optical component thus makes it possible to carry out interferometry. In use, the object beam interacts with the sample to be analysed along a whole surface, and the reference beam interacts with the reference sample along a whole surface. The interference obtained thus relates to a whole surface of the sample to be analysed. The optical component thus enables attenuated total reflection imaging to be performed. The optical component, combined with other elements such as an array detector and at least one light source, can thus form an interferometric device utilising the attenuated total reflection phenomenon. Different wavelengths can be injected into the optical component to form a multi-spectral imaging device.

The optical component thus makes it possible to perform attenuated total reflection interferometric imaging, using a single component consisting of the planar waveguide with its input facets and its output facets. The optical component thus offers a simple robust means of obtaining an interferometric image utilising the attenuated total reflection phenomenon.

Since the image is formed by phase measurements, it does not matter if the sample to be analysed contains both highly absorbing compounds such as water, and weakly absorbing compounds over a same wavelength range. This image can be used to determine a distribution of local chemical or biological compositions on the sample to be analysed, by utilising the fact that each chemical or biological compound absorbs (and phase-shifts) some frequencies of an incident radiation, with a specific signature allowing identification (identification by spectroscopy, especially infrared spectroscopy). It is thus possible to determine the chemical or biological composition of the sample to be analysed, even in the presence of highly absorbent compounds likely to cover the signature of other compounds that are more weakly absorbent in the same wavelength range.

Preferably, the two input facets form two adjacent side faces of a first pyramid. Said first pyramid may be a square-base straight pyramid.

According to a first advantageous embodiment, the two output facets each extend from a second side face of the planar waveguide, with the first and second side faces of the planar waveguide located facing each other. The two output facets may form two adjacent side faces of a whole or truncated second pyramid. Said second pyramid may be a square-base straight pyramid. The optical component may have planar symmetry, relative to a plane of symmetry orthogonal to the plane of the front and rear faces of the planar waveguide, and passing through the centre of the injection zone and through the centre of the extraction zone. Advantageously, the planar waveguide includes a third side face and a fourth side face, located facing each other and each extending between the first side face receiving the injection zone and the second side face receiving the extraction zone, and tilted to each other so that a distance between the third side face and the fourth side face decreases by moving away from the injection zone and closer to the extraction zone.

According to a second advantageous embodiment, the extraction zone is completely surrounded by the material of the planar waveguide. The extraction zone may include at least four facets, among which the two output facets that are located facing each other. The at least four facets may all be tilted by the same angle relative to the plane of the front and rear faces of the planar waveguide.

Advantageously:
  the injection zone is configured to perform injection, into the planar waveguide, of light rays from a front half-space; and
  the extraction zone is configured to perform extraction of light rays, out of the planar waveguide, and towards said front half-space;
  wherein the front half-space is delimited by a plane passing through the front face of the planar waveguide, and extends on the side opposite to the planar waveguide.

It is also proposed a system which includes:
an optical component; and
an array detector, configured to acquire an interference pattern formed by at least a part of light emerging from the optical component through one of the output facets and at least a part of light emerging from the optical component through the other of the output facets.

The system may further include a processing module configured to:
- receive as an input at least one image acquired by the array detector;
- perform processing of said image so as to deduce local phase shift values therefrom; and
- output an image of a sample to be analysed, formed from said local phase shift values.

It is also proposed a method for using an optical component, which comprises the following steps of:
- arranging a surface of interest of a sample to be analysed, against an analysis surface formed by a first region of the rear face of the planar waveguide, and arranging a surface of interest of a reference sample, against a reference surface formed by a second region of the rear face of the planar waveguide;
- injecting light into the planar waveguide at the injection zone, so that a part of the injected light propagates in the planar waveguide, from the injection zone to one of the output facets of the extraction zone, passing through the analysis surface, and so that another part of the injected light propagates in the planar waveguide, from the injection zone to the other of the output facets of the extraction zone, passing through the reference surface; and
- detecting an interference pattern formed by light emerging from the planar waveguide through the first output facet and the second output facet respectively.

BRIEF DESCRIPTION OF THE FIGURES

The present invention will be better understood upon reading the description of exemplary embodiments given by way of illustration only and in no way limiting purposes, with reference to the appended drawings in which.

DESCRIPTION OF THE EMBODIMENTS

For ease of reading, axes of an orthonormal reference frame (Oxyz) have been shown in the figures.

Throughout the text, a planar waveguide refers to an optical guiding element, capable of guiding light propagation by successive reflections on planar faces parallel to each other (in this case, it is more particularly refractive guiding). In a planar waveguide, light is confined along one of the axes of the three-dimensional space, and free to propagate along the other two axes of the three-dimensional space. Formally, a waveguide consists of a core, in which light circulates, and a sheath, ensuring a desired optical index difference between the core and a medium surrounding the core. Through misuse of language, the core can be assimilated to a waveguide, the sheath then consisting of the surrounding gaseous or liquid medium. Here, a planar waveguide thereby refers to the core of a planar waveguide. The planar waveguide in practice consists of an optical part with a reduced dimension along one of the axes of the three-dimensional space (here the axis (Oz) of the thickness), and with large dimensions along each of the other two axes of the three-dimensional space (here the axes (Ox) and (Oy) of the length, respectively the width). The ratio of thickness to length, respectively thickness to width, is preferably greater than or equal to 5, or even greater than or equal to 10. The optical part consists of a material optically transparent to the wavelengths to be propagated, for example with a transmission rate greater than or equal to −3 dB/cm at said wavelengths. This optical part is preferably monolithic, formed in one piece. It advantageously has a homogeneous optical index throughout its volume, with an identical chemical composition throughout its volume.

Figure 1:
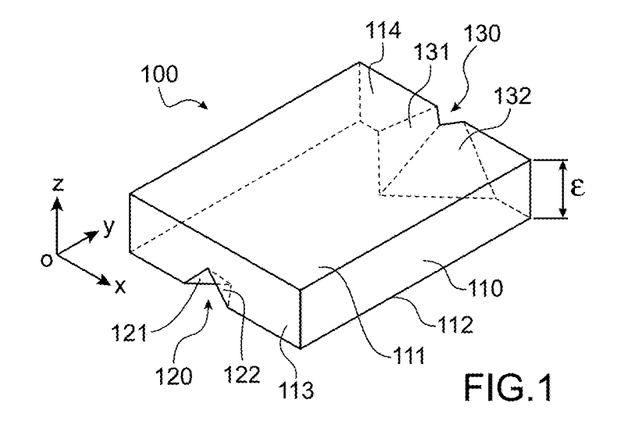
FIG. 1 schematically illustrates, in a see-through perspective view, an optical component according to a first embodiment.

A first embodiment of an optical component 100 is first described, shown in FIG. 1 in a perspective view.

The optical component 100 includes a planar waveguide 110. The planar waveguide 110 is configured to guide light in planes parallel to the plane (Oxy), here infrared light. It therefore consists of an infrared optically transparent material, for example silicon. Alternatively, the planar waveguide 110 can be configured to guide visible light. It then consists of a visible optically transparent material, for example diamond or, if made by moulding, a glass ($SiO_2$, BF33, quartz, etc.) or an optical polymer.

Preferably, the planar waveguide 110 has substantially the shape of a square- or rectangular-base rectangular parallelepiped. Here, it has exactly this shape. It is delimited, along the axis (Oz), by two faces 111, 112 parallel to the plane (xOy), and respectively called rear face 111 and front face 112. The rear face 111 and the front face 112 are the faces of the planar waveguide with the largest area, here with rectangular shape. The thickness ε of the planar waveguide 110 is preferably between 100 μm and 1.5 mm, preferably between 100 μm and 1.0 mm, for example equal to 725 μm. The length and width of the planar waveguide 110 are each, for example, between 5 mm and 20 mm.

The planar waveguide includes an injection zone 120. The injection zone 120 is configured to allow light injection into the planar waveguide 110. The injection zone 120 here consists of two input facets 121 and 122, each forming an interface between the planar waveguide 110 and the surrounding medium. The input facets 121 and 122 are each obliquely tilted relative to the plane (Oxy) of the front and rear faces of the planar waveguide. Stated differently, they are each tilted by a non-zero angle, distinct from the right angle, relative to said front and rear faces. The input facets 121 and 122 both extend between the front face 112 of the planar waveguide 110, and a first side face 113 of the planar waveguide 110. The input facets 121 and 122 are configured together to separate an initial light beam into two sub-beams, each deflected in a respective direction when they enter the planar waveguide.

The planar waveguide further includes an extraction zone 130. The extraction zone 130 is configured to allow light extraction out of the planar waveguide 110, where extracted light is the light that was injected at the injection zone 120. The extraction zone 130 here consists of two output facets 131 and 132, each forming an interface between the planar waveguide 110 and the surrounding medium. The output facets 131 and 132 are each obliquely tilted relative to the plane (Oxy) of the front and rear faces of the planar waveguide. Each of the output facets 131, 132 is configured to receive light from a respective one of both above mentioned sub-beams, and to let this light pass out of the planar waveguide. Upon passing through the output facets 131, 132, light of the two sub-beams is deflected in such a way.

The geometry of the optical component 100 is adapted so that the two sub-beams can interfere with each other, after emerging from the planar waveguide. This adaptation relates in particular to the orientation of the input facets 121 and 122, and/or the orientation of the output facets 131 and 132, and/or the orientation of two side faces of the planar waveguide (see FIG. 3). Preferably, this geometry is adapted to an initial light beam that is oriented in a plane (Oyz), preferably a plane (Oyz) passing through the centre of the injection zone. It may be a plane (Oyz) forming a plane of symmetry for the planar waveguide considered alone (neither with the injection zone nor the extraction zone).

In this example, the injection zone 120 and the extraction zone 130 each form a respective recess in the planar waveguide, sinking into the planar waveguide from its side face 113, respectively from its side face 114 on the side opposite to the side face 113.

Next, with reference to FIGS. 2A to 2D, light propagation in the optical component 100 of FIG. 1 is described. In operation, the optical component 100 is immersed in a gaseous or liquid surrounding medium, preferably air.

Figure 2A:
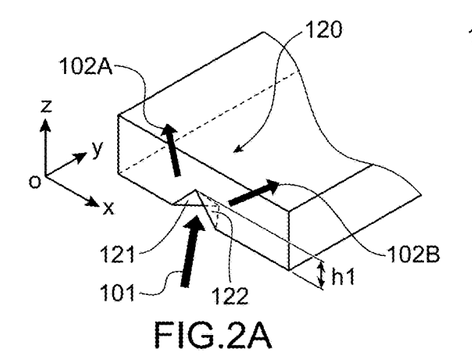
FIGS. 2A-2D illustrate different views showing all or part of the optical component of FIG. 1, and illustrating light propagation therein.

In FIG. 2A, a detail view of the optical component 100 has been shown in perspective. FIG. 2A more specifically illustrates the injection zone 120, in use. The two input facets 121, 122 are tilted to each other, so that each deflects light in a different direction. In use, an initial light beam 101 impinges on the input facets 121 and 122. The initial light beam 101 preferably has a component parallel to the axis (Oz). Preferably, the initial light beam 101 extends in a plane (Oyz), here a plane (Oyz) forming a plane of symmetry for the planar waveguide considered alone (neither with the injection zone nor the extraction zone). A part of the initial light beam 101 impinges on the first input facet 121, with an incidence such that the light penetrates inside the planar waveguide, being refracted in a first direction, and forms a sub-beam 102A. Another part of the initial light beam 101 impinges on the second input facet 122, with an incidence such that light enters inside the planar waveguide, being refracted in a second direction distinct from the first direction, and forms a sub-beam 102B. Here, the two input facets 121, 122 are adjacent, so that the two input facets 121, 122 together receive all the light of the initial light beam 101. Thus, as it passes through the injection zone 120 to penetrate inside the planar waveguide 110, the initial light beam 101 is separated into two sub-beams 102A, respectively 102B. Preferably, flow distribution between the two sub-beams is a 50%-50% distribution. However, other distributions can be contemplated, for example to compensate for very high absorption of the sample to be analysed.

Here, the initial light beam 101 impinges on the input facets 121, 122, from a half-space delimited by the plane of the front face 112 of the planar waveguide 110 and located on the side opposite to the planar waveguide.

Here, the input facets 121, 122 are symmetrical to each other relative to a plane of symmetry parallel to the plane (Oyz), where the plane (Oyz) is orthogonal to the plane of the front and rear faces of the planar waveguide 110. Thus, when they enter the planar waveguide, the sub-beams 102A and 102B are symmetrical to each other relative to this plane of symmetry.

In the example illustrated here, the height h1 of the injection zone, measured along the axis (Oz), is strictly lower than the thickness ε of the planar waveguide. A ratio of the thickness ε to the height h1 is for example greater than or equal to two. However, the invention is not limited to such a ratio, and even covers alternatives in which the height h1 of the injection zone is equal to the thickness ε of the planar waveguide.

Figure 2B:
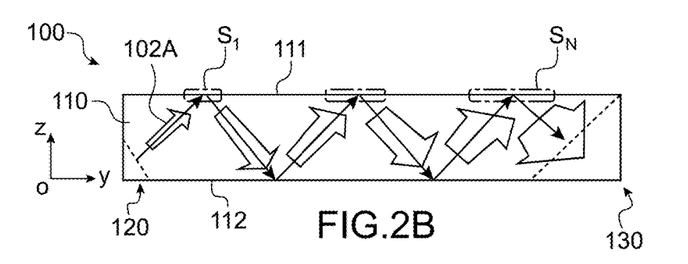

FIG. 2B is a schematic representation of the optical component 100, in a see-through side view. This figure shows, as an example, propagation of the sub-beam 102A in the planar waveguide 110, it being understood that the sub-beam 102B propagates according to the same principle. The sub-beams 102A and 102B each propagate inside the planar waveguide 110, by successive reflections on the front 112 and rear 111 faces thereof. Inside the planar waveguide 110, the sub-beams 102A and 102B do not meet. As they propagate through the planar waveguide 110, each of the sub-beams 102A, 102B spreads in planes parallel to the plane (Oxy).

Preferably, the initial light beam 101 is, even very slightly, divergent. The intersection between the sub-beam 102A, respectively 102B, and the rear face 111 of the planar waveguide is then a surface $S_1, \ldots, S_N$, the area of which increases as light propagates in the planar waveguide 110. An analysis surface 141A is defined on the rear face 111 of the planar waveguide (see FIG. 2C).

The analysis surface 141A here corresponds to the intersection between the sub-beam 102A and the rear face 111 of the planar waveguide, at the last incidence of the sub-beam 102A on said rear face. The analysis surface therefore has a much larger area than the cross-section of the sub-beam 102A upon injection into the planar waveguide. For example, there is a ratio greater than or equal to 5, and even greater than or equal to 10, of the area of the analysis surface 141A to the cross-section area of the sub-beam 102A upon injection into the planar waveguide. Similarly, a reference surface 141B is defined on the rear face 111 of the planar waveguide (see FIG. 2C). The reference surface 141B corresponds to the intersection between the sub-beam 102B and the rear face 111 of the planar waveguide, at the last incidence of the sub-beam 102B on said rear face. Similarly, the reference surface therefore has a much larger area than the cross-section of the sub-beam 102B upon injection into the planar waveguide. The analysis surface 141A and the reference surface 141B preferably have the same area.

Figure 2C:
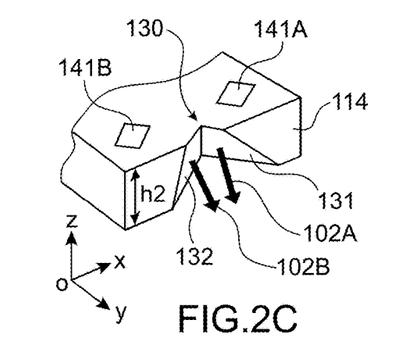

In FIG. 2C, a perspective detail view of the optical component 100 is shown, more specifically showing the extraction zone 130, in use. After a final reflection on the rear face 111 of the planar waveguide, the sub-beam 102A emerges out of the planar waveguide, passing through the first output facet 131. In the same way, after a final reflection on the rear face 111 of the planar waveguide, the sub-beam 102B emerges out of the planar waveguide, passing through the second output facet 132. The two output facets 131, 132 are tilted to each other. They are configured together to deflect the sub-beams 102A and 102B outwardly of the planar waveguide, here in a half-space which is delimited by the plane of the front face 112 of the planar waveguide 110 and which is located on the side opposite to the planar waveguide. Here, the output facets 131 and 132 both extend between the front face 112, the rear face 111, and a second side face 114 of the planar waveguide 110, on the side opposite to the first side face 113. Thus, the height h2 of the extraction zone, measured along the axis (Oz), is equal to the thickness ε of the planar waveguide. Here, the two output facets 131, 132 are adjacent to each other.

Here, the sub-beams 102A and 102B impinging on the output facets 131, 132 are symmetrical to each other, relative to a plane of symmetry parallel to the plane (Oyz). The two output facets 131, 132 are capable of deflecting the sub-beams 102A and 102B, so that they interfere with each other after emerging out of the planar waveguide. For this, the two output facets 131, 132 have together an asymmetry relative to said plane of symmetry parallel to the plane (Oyz).

Figure 2D:
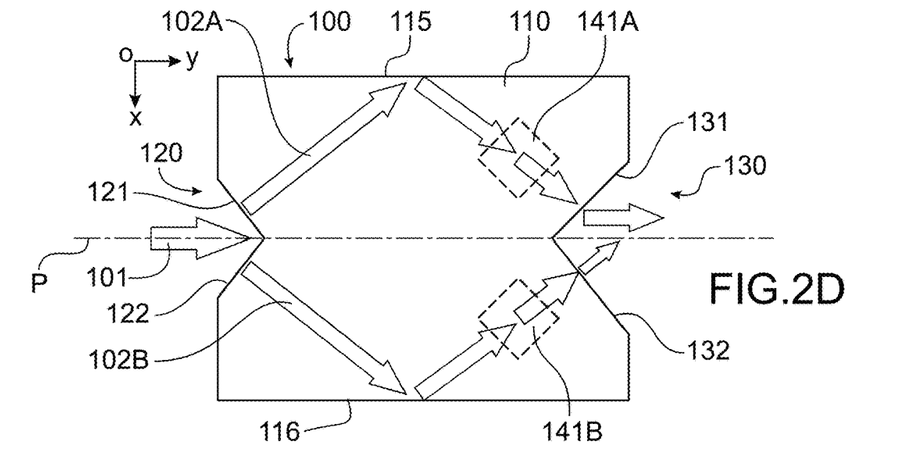

FIG. 2D schematically illustrates the optical component 100, shown in a cross-section view in a plane (Oxy) passing through the injection zone 120. In FIG. 2D, light propagation in the planar waveguide 110 has been shown, in a projection into a plane (Oxy). The sub-beam 102A propagates from the first facet 121 of the injection zone to the first facet 131 of the extraction zone, being reflected once on the side face 115 of the planar waveguide. The side face 115 is located between the side faces 113 and 114, and here extends parallel to the plane (Oyz). The sub-beam 102A passes through the analysis zone 141A, shown here in a see-through illustration by dotted lines. Similarly, the sub-beam 102B propagates from the second facet 122 of the injection zone to the second facet 132 of the extraction zone, being reflected once on the side face 116 of the planar waveguide. The side face 116 is located on the side opposite to the side face 115, and here extends parallel to the plane (Oyz). The sub-beam 102B passes through the reference zone 141B, shown here in a see-through illustration by dotted lines.

As shown especially in FIG. 2D, the optical component 100 is substantially symmetrical, in a planar symmetry relative to a plane of symmetry P parallel to the plane (Oyz) and passing through the centre of the injection zone 120 and through the centre of the extraction zone 130. When the initial light beam 101 is oriented along an axis located in the plane P, this symmetry allows the sub-beams 102A and 102B to travel along respective optical paths of the same length in the planar waveguide. A reference arm and an object arm are thus defined in the planar waveguide, both of which have the same optical length. Here, the symmetry is not perfect, simply due to the slight asymmetry of the extraction zone 130. By contrast, the analysis surface 141A and the reference surface 141B are perfectly symmetrical to each other relative to the plane P.

The sub-beams 102A and 102B emerging from the optical component 100 have to be able to interfere with each other. For this, they have to be oriented in intersecting directions. In the example illustrated here, this characteristic is obtained by adjusting orientation of the two output facets 131, 132. In addition or alternatively, this characteristic can be obtained by adjusting orientation of the two input facets 121, 122. In addition or alternatively, this characteristic can be obtained by adjusting the orientation of the side faces of the planar waveguide (see FIG. 3). These different solutions can be combined with each other. According to another alternative, this characteristic can be obtained by rather adjusting orientation of the initial light beam impinging on the injection zone (the initial light beam then has to be slightly tilted relative to the plane P).

Figure 3:
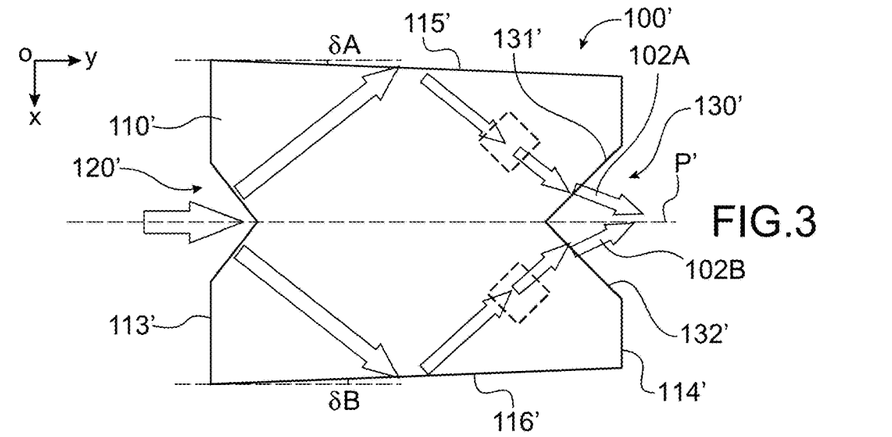
FIG. 3 schematically illustrates, in a cross-section view in a plane parallel to the front and rear faces of the planar waveguide, an optical component according to one alternative of the first embodiment.

FIG. 3 schematically illustrates an optical component 100', shown in a cross-section view in a plane (Oxy) parallel to the plane of the front and rear faces of the planar waveguide. The optical component 100' only differs from the optical component of FIG. 1 in the orientation of the side faces 115', 116' of the planar waveguide 110', and in the orientation of the output facets 131', 132' of the planar waveguide.

The side face 115' extends between the first side face 113' receiving the injection zone 120', and the second side face 114' receiving the extraction zone 130'. The side face 115' is tilted by a small angle δA relative to the plane (Oyz), where the plane (Oyz) is parallel to the plane of symmetry P' of the optical component 100'. The angle δA is advantageously between 0.50° and 5.00°, for example equal to 1.23°.

The side face 116' extends facing the side face 115', between the first side face 113' and the second side face 114'. Due to the symmetry of the optical component 100', the side face 116' is tilted by an angle δB relative to the plane (Oyz). The angle δB is advantageously between 0.50° and 5.00°. Preferably, the angles δA and δB are equal in absolute value. Alternatively, the difference in absolute value between these two angles may be non-zero. This alternative may make it possible, by virtue of the moiré phenomenon, to obtain an image with interference fringes whose interfringe is compatible with the dimensions of a detector.

Tilting of the side faces 115' and 116' is such that the distance between them decreases by moving away from the injection zone 120' and closer to the extraction zone 130', along the axis (Oy). The axis (Oy) corresponds to an axis connecting the injection zone and the extraction zone. The distance between the side faces 115' and 116' is measured along the axis (Ox), with the axes (Ox) and (Oy) orthogonal to each other and parallel to the plane of the front face and rear face of the planar waveguide respectively.

This slight tilting of the side faces 115' and 116' ensures that, in use, the sub-beams 102A and 102B emerging from the extraction zone 130' intersect and interfere with each other. The output facets 131, 132 may then be symmetrical to each other relative to the plane P', where the plane P' extends parallel to the plane (Oyz) by passing through the centre of the injection zone and the centre of the extraction zone. Here, the output facets 131', 132' are symmetrical to each other relative to the plane P', and the angles δA and δB are equal in absolute value, so that the optical component 100' has perfect symmetry relative to the plane P'. Here, advantageously, the output facets 131', 132' are parallel in twos with the input facets.

Figure 4:
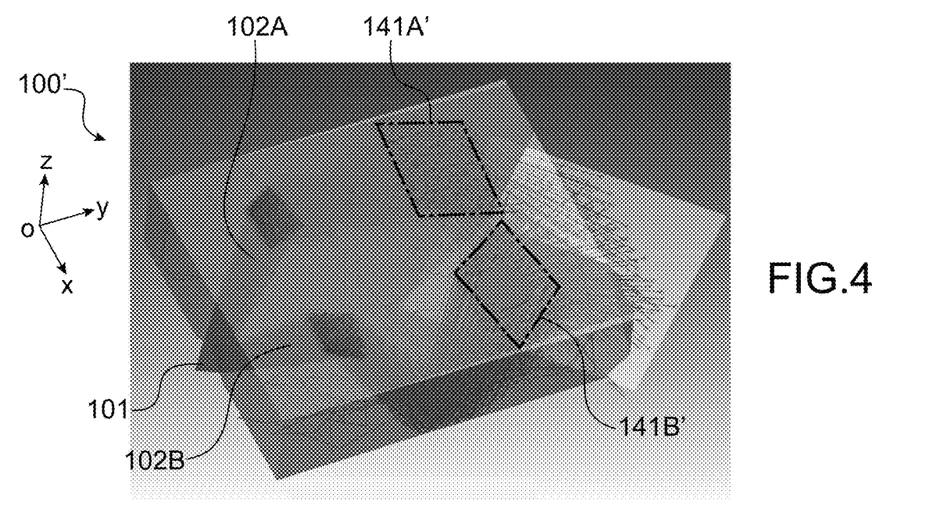
FIG. 4 illustrates a simulation of ray tracing in the optical component of FIG. 3.

FIG. 4 illustrates the optical component 100', in a perspective view, as well as a simulation of ray tracing in said component. FIG. 4 shows especially the initial light beam 101, the sub-beams 102A, 102B, the analysis surface 141A' and the reference surface 141B[1]. In this simulation, the planar waveguide has a thickness of 1 mm. The input facets and output facets are all tilted at 54.74° relative to the plane (Oxy). The input facets are etched to a depth of 300 μm into the planar waveguide. The output facets are etched through the entire thickness of the planar waveguide. The front face of the planar waveguide has a rectangular shape of approximately 3.6 mm×4.2 mm. The angle δA=δB is 1.23°. The simulation confirms that the expected light behaviour is achieved.

The simulation also confirms that, in the embodiment shown in FIG. 3, the sub-beam propagating on the reference arm and the sub-beam propagating on the object arm, circulate in the optical component with equal reflection on the front and rear faces, and on the side faces of the planar waveguide. This characteristic is also true in the embodiment shown in FIGS. 1 and 2A to 2D, and in their alternatives mentioned above.

Figure 5A:
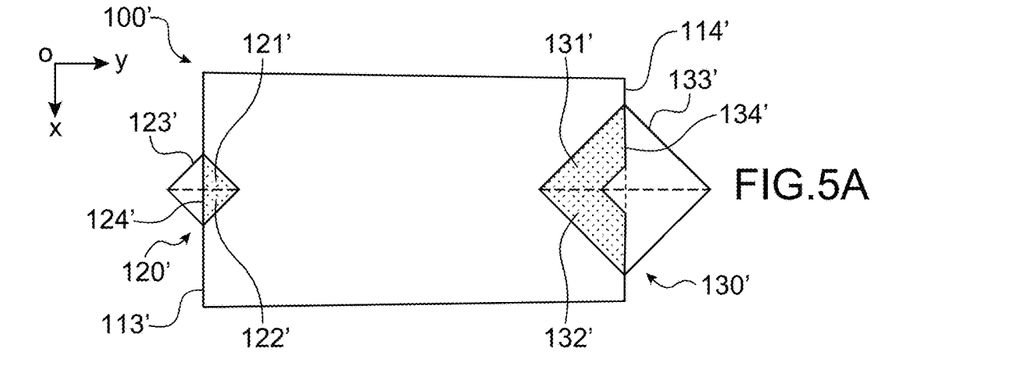
FIG. 5A-5C schematically illustrate pyramids defining the respective shapes of the injection zone and the extraction zone in the optical component of FIG. 3.

FIG. 5A illustrates here the optical component 100' of FIG. 3, in a top view. FIG. 5A further more precisely illustrates a shape of the injection zone and a shape of the extraction zone.

In the injection zone 120', the input facets 121', 122' correspond to two adjacent side faces of a first, either whole or truncated, pyramid 123'. The height of the first pyramid 123' is here strictly lower than the thickness of the planar waveguide, so that the input facets 121', 122' correspond to two adjacent side faces of the first, whole pyramid 123'. The injection zone 120' has the shape of one half of this whole pyramid. This half of the pyramid is shown in dotted lines, and corresponds to the pyramid 123' intersected along a plane (Oxz) passing through its apex.

Figure 5B:
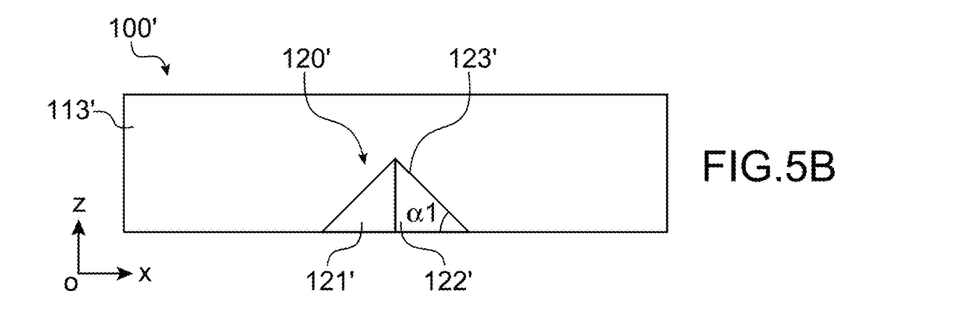

Here, the first pyramid 123' is a square-base straight pyramid, with the base parallel to the plane (Oxy). A diagonal 124' of said square base extends along an axis passing through an edge of the planar waveguide, where said edge defines intersection between the front face and a side face of the planar waveguide. Each of the input facets 121', 122' is therefore tilted by a same angle α1 relative to the plane (Oxy) of the front and rear faces of the planar waveguide. This angle α1 is shown in FIG. 5B, showing the optical component 100' in a side view in a plane parallel to the plane (Oxz). Preferably, α1=54.74°, which corresponds to an anisotropic etch angle of a crystal plane (plane 111) in a face-centred cubic type crystal (for example silicon) or in a diamond type square-lattice crystal. Alternatively, there can be α1=45° (plane 110 of a face-centred cubic crystal). However, the invention is not limited to these two angle values.

In the extraction zone 130', the output facets 131', 132' correspond to two adjacent side faces of a second, whole or truncated, pyramid 133'. Here, the output facets 131', 132' extend along the entire thickness of the planar waveguide, each between the rear face, the front face and the second side face 114' of the planar waveguide. The output facets 131', 132' therefore correspond to two adjacent side faces of a second pyramid 133', truncated along a plane parallel to the plane (Oxy). The height of the second pyramid 133' is here therefore strictly greater than the thickness of the planar waveguide. The extraction zone 130' has here the shape of one half of this truncated pyramid. This half is shown in dotted lines, and corresponds to the pyramid 133', truncated in a plane (Oxy), and intersected along a plane (Oxz) passing through its apex.

Figure 5C:
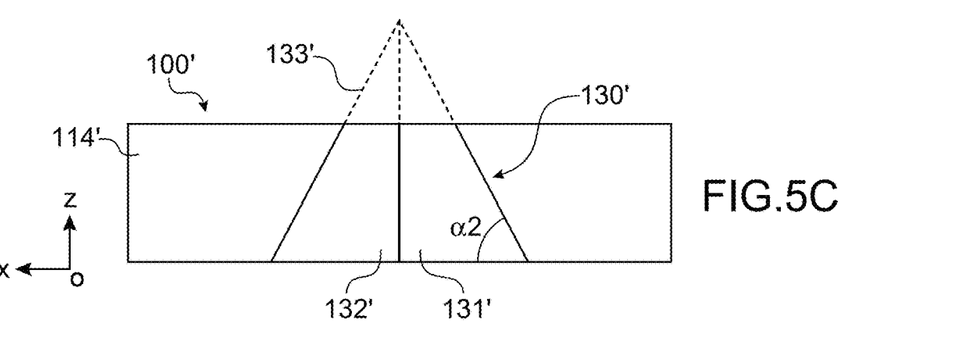

Here, the second pyramid 133' is a square-base straight pyramid, with the base parallel to the plane (Oxy). A diagonal 134' of said square base extends along an axis passing through an edge of the planar waveguide, where said edge defines the intersection between the front face and a side face of the planar waveguide. Each of the input facets 131', 132' is therefore tilted by a same angle α2 relative to the plane (Oxy) of the front and rear faces of the planar waveguide. This angle α2 is shown in FIG. 5C, showing the optical component 100' in a side view in a plane parallel to the pane (Oxz). Preferably, α2=54.74°, or α2=45°. However, the invenltion is not limited to these two angle values. Furthermore, the angles α2 and α1 may be equal to each other, or distinct from each other.

In alternatives not shown, the output facets 131', 132' extend along only part of the thickness of the planar waveguide. Again, they may correspond to two adjacent side faces of a second, whole or truncated, pyramid. In any event, they extend, again, from the second side face 114' of the planar waveguide, on the side opposite to the first side face 113'.

Figure 6:
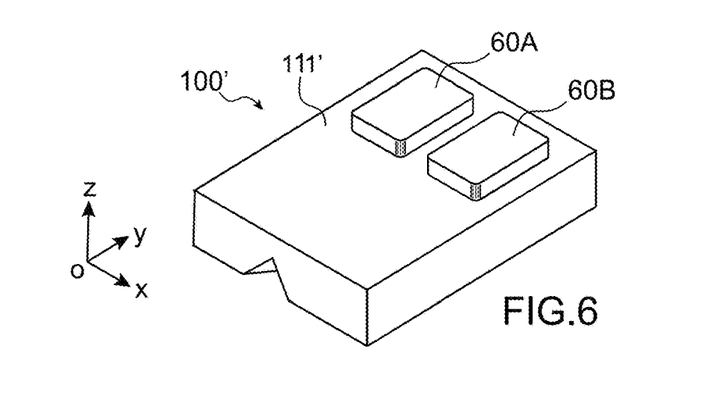
FIG. 6 schematically illustrates, in a perspective view, the optical component of FIG. 3, in use.

FIG. 6 schematically illustrates, in a perspective view, an optical component, in use (here the optical component 100'). The optical component 100' is used with a sample to be analysed 60A and a reference sample 60B.

The analysis sample 60A is a sample whose chemical or biological composition is desired to be determined. It is adjoined against the rear face 111' of the planar waveguide, at the analysis surface as described above.

The reference sample 60B is here a sample whose chemical or biological composition is known, and preferably uniform throughout its volume. Preferably, it is associated with a known spectrum of its attenuated total reflection. Alternatively, the reference sample may consist of a mirror entirely reflective at the wavelength of the initial light beam 101, or a sample consisting of the medium in which the sample to be analysed is immersed (for example an aqueous medium), or a sample for which the ATR spectrum is known and/or calibrated, etc. The reference sample 60B is adjoined against the rear face 111' of the planar waveguide, at the reference surface as described above.

In use, light is injected into the planar waveguide, as described above. The sub-beam 102A forms an object beam, passing through the analysis surface. At the analysis surface, part of the light of the object beam penetrates inside the sample to be analysed 60A as an evanescent wave. Light returned from the scanning surface thus includes a wave that has passed through the sample to be analysed, and has been phase shifted and partially absorbed by the same. The object beam then emerges out of the planar waveguide, through the first output facet.

The sub-beam 102B in turn forms a reference beam, passing through the reference surface. At the reference surface, part of the light of the reference beam penetrates inside the reference sample 60B, as an evanescent wave. Light returned from the reference surface thus includes a wave that has passed through the reference sample, and has been phase shifted and partially absorbed by the reference sample. The reference beam then emerges out of the planar waveguide, through the second output facet.

The object beam emerging out of the planar waveguide includes information relating to the sample to be analysed 60A, especially contained in its phase. This information relates to an entire surface of the sample to be analysed 60A, corresponding to the surface thereof covering the analysis surface.

The reference beam emerging out of the planar waveguide in turn has known characteristics, since it depends on the known (and preferably spatially constant) characteristics of the reference sample.

The optical component is configured so that the reference beam and the object beam both emerging out of the planar waveguide interfere with each other. The interference pattern thus obtained makes it possible to determine a distribution of phase shift values on the sample to be analysed. From this distribution of phase shift values, a distribution of local chemical or biological compositions in the sample to be analysed can be determined. The invention allows phase shift values to be obtained directly for a plurality of points on the sample to be analysed, without a scanning step to move the optical component relative to the sample to be analysed.

In the above explanation, it is assumed that the sub-beam 102A forms the object beam and the sub-beam 102B forms the reference beam. Obviously, these functions can be interchanged.

Figure 7A:
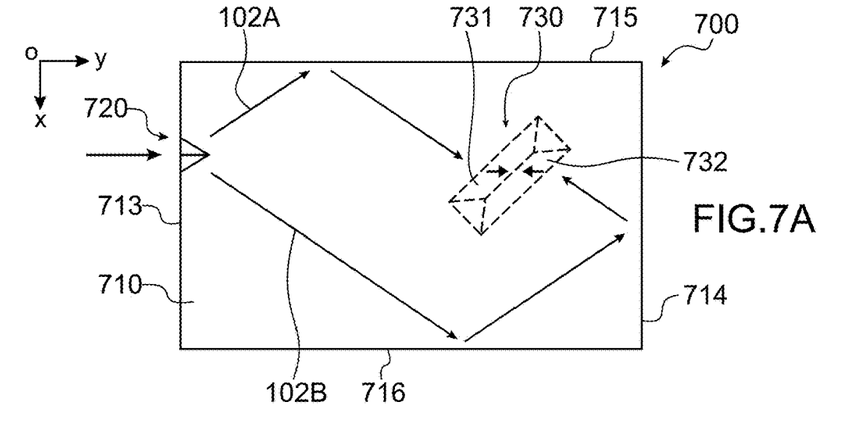
FIG. 7A schematically illustrates, in a see-through top view, an optical component according to a second embodiment.

FIG. 7A illustrates, in a see-through top view, an optical component 700 according to a second embodiment, which will be described only for its differences relative to the embodiment of FIG. 1.

In this embodiment, the extraction zone 730 is completely surrounded by the material of the planar waveguide 710. The extraction zone 730 here consists of four facets, obliquely tilted to the plane (Oxy) of the front and rear faces of the planar waveguide. The four facets comprise two output facets 731, 732, which differ from the output facets of the first embodiment in that they extend here facing each other, and not adjacent to each other.

Here, the four facets are all tilted by a same angle relative to the plane (Oxy). They may each have the same shape, thus defining a volume in the form of a whole or truncated pyramid. Alternatively, and as illustrated in FIG. 7A, the output facets each have the same shape, here a trapezoidal shape, distinct from the shape of the other two facets.

Here, the output facets 731, 732 are symmetrical to each other relative to a plane of symmetry orthogonal to the plane (Oxy) and obliquely oriented relative to the axis (Oy), where the axis (Oy) extends orthogonal to the input side face 713. Here, this plane of symmetry is oriented 45° relative to the axis (Oy).

The extraction zone 730 may form a simple recess in the planar waveguide, or a through opening passing right through the planar waveguide in the thickness direction.

In this embodiment, the sub-beam 102A is reflected only once on a side face of the planar waveguide 710, before reaching the first output facet 731. Here, the sub-beam 102A is reflected on the side face 715, between the side face 713 receiving the injection zone and the side face 714 located on the side opposite to the side face 713.

The other sub-beam 102B is reflected twice on a side face of the planar waveguide 710, before reaching the second output facet 732. Here, the sub-beam 102B is reflected on the side face 716, on the side opposite to the side face 715, and on the side face 714.

In this embodiment, the injection zone 720 is off-centre relative to the centre of the side face 713 of the planar waveguide. The initial light beam preferably propagates in a plane (Oyz) passing through the centre of the injection zone 720.

Figure 7B:
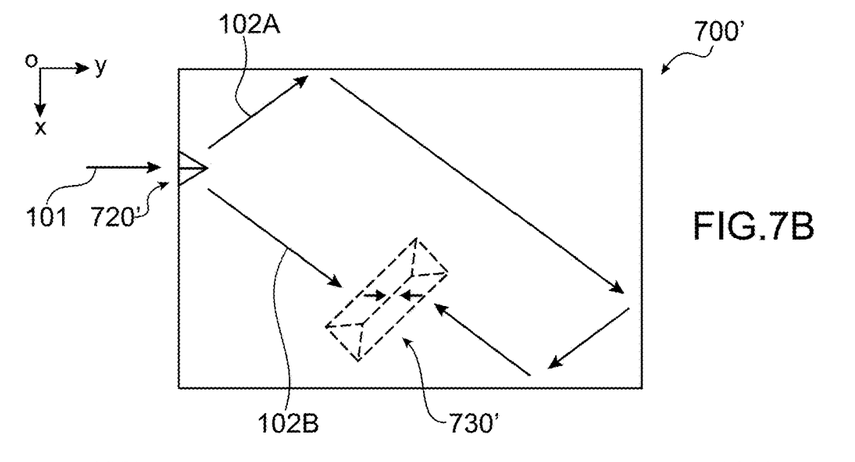
FIG. 7B schematically illustrates, in a see-through top view, an optical component according to an alternative of the second embodiment.

FIG. 7B illustrates an optical component 700' according to an alternative embodiment of FIG. 7A.

This alternative only differs from the embodiment of FIG. 7A in that the extraction zone 730' is translated in a plane (Oxy), such that:
- the sub-beam 102B directly propagates from the injection zone 720' to the one output facet of the extraction zone 730', without intermediate reflection on a side face of the planar waveguide; and
- the sub-beam 702A propagates from the injection zone 720' to the other output facet, being reflected on three respective side faces of the planar waveguide.

In the alternatives of FIGS. 7A and 7B, the sub-beams 102A and 102B emerge from the extraction zone propagating in opposite directions, thus simplifying the interference patterns. On the other hand, the object arm and the reference arm defined in the optical component do not have the same optical length. This results in a different magnification on the sub-beam 102A and the sub-beam 102B, as they propagate from the injection zone to the extraction zone. This difference in magnification can be compensated for, upon injection, by adjusting the coverage surfaces between the initial light beam 101 and the first or second input facet.

Figure 8:
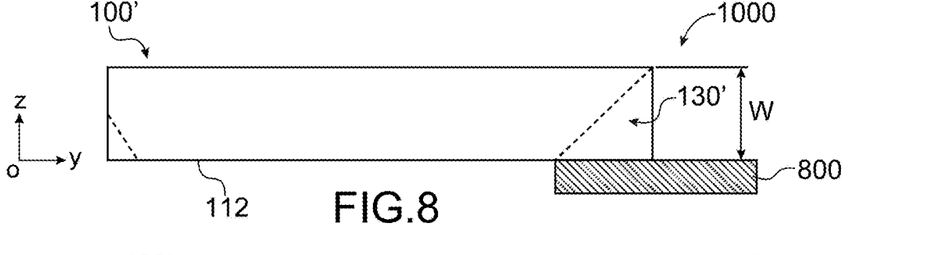
FIG. 8 schematically illustrates a first example of a system according to one embodiment.

FIG. 8 schematically illustrates a first example of a system 1000, shown in a see-through side view, in a plane (Oyz). The system 1000 comprises an optical component 100' and a detection module 800.

Here, but not limited to, the optical component is of the type shown in FIG. 3.

The detection module 800 comprises an array detector, which is configured to acquire an interference pattern formed by at least a part of the light emerging from the optical component 100' through the one output facet and by at least a part of the light emerging from the optical component 100' through the other output facet. The array detector is sensitive to at least one wavelength to be injected as an input to the, here infrared sensitive, optical component.

The array detector is preferably an array infrared detector, for example a bolometer array, or a photodiode array. Alternatively, the array detector may be sensitive in the visible range, for example consisting of a photodiode array. The array detector extends over a surface area preferably between 1 mm and 30 mm wide. For example, it is an array comprised of 80×80 pixels distributed over a square with 2.72 mm side. Preferably, the dimensions of a capture surface of the array detector are substantially equal to the dimensions of the analysis surface and the reference surface in the optical component 100'.

The array detector extends parallel to the plane (Oxy), in proximity to the extraction zone 130' of the optical component. The array detector preferably extends at a distance W from a plane (Oxy) passing through the analysis and reference surfaces, with W between 100 μm and 1.5 mm. Advantageously, the array detector extends in the plane of the front face 112 of the planar waveguide. The optical component can then serve as a spacer between the sample to be analysed (and the reference sample) and the array detector. There is no image forming optics between the array detector and the sample-receiving surfaces, in use.

It is possible that in practice an interference pattern with fringes too small to be resolved with the array device will be obtained. Nevertheless, fringes may still be observed, by virtue of the rasterisation or moiré phenomenon that occurs in case of undersampling.

Figure 9:
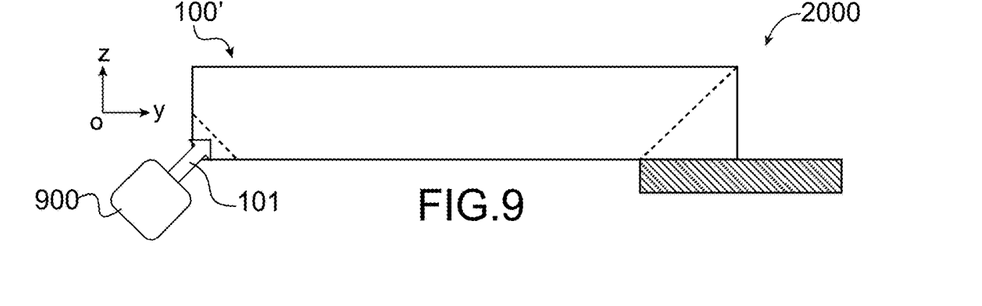
FIG. 9 schematically illustrates a second example of a system according to one embodiment.

FIG. 9 schematically illustrates a second example of a system 2000 shown in a see-through side view in a plane (Oyz).

The system 2000 only differs from the system of FIG. 8, in that it further comprises a light emission module 900, configured to emit at least one initial light beam 101 injected into the optical component 100' at the injection zone. The light emission module 900 is configured to emit light at at least one wavelength, here in the infrared range, to be injected as an input to the optical component. The module 900 comprises one or more, preferably monochromatic, light sources. It may comprise a plurality of monochromatic sources, for example several quantum cascade lasers. When the module 900 comprises several monochromatic sources and/or at least one polychromatic source (accompanied with a filter system), the optical component makes it possible to carry out multi-spectral interferometric imaging, for a more complete characterisation of the sample to be analysed.

Several discrete wavelengths can be injected into the planar waveguide, simultaneously or successively. There are no limitations on the number of discrete wavelengths that can be injected. However, the spectral width of a light signal injected into the planar waveguide has to remain below a predetermined threshold to maintain sufficient fringe contrast. The material of the planar waveguide is preferably weakly dispersive at the wavelengths injected. The planar waveguide is advantageously made of silicon, a material that is weakly infrared dispersive. Other materials are also possible, for example crystalline germanium, crystalline zinc sulphide, crystalline barium chloride, crystalline barium fluoride, for applications in the far infrared range, at wavelengths that can range beyond 10 µm. Other materials are also possible, for example diamond, a glass ($SiO_2$, BF33, quartz, etc) or an optical polymer, for applications in the visible range.

In FIG. 9, an initial light beam 101 is shown as being obliquely oriented relative to the axes (Oz) and (Oy). Alternatively, the initial light beam 101 may be oriented parallel to the axis (Oz).

It is also disclosed an optical system, not shown, which includes:
- an optical component; and
- a calculator, connected to the array detector, configured to receive as an input, light intensity measurements provided by the detector, and to output an image of the sample to be analysed.

The light intensity measurements together form an interference pattern. The interference pattern has fringe shifts, related to phase shifts brought by the sample to be analysed, a loss of fringe contrast, related to absorption by the sample to be analysed, and generally a moiré effect related to undersampling by the array detector.

The image of the sample to be analysed may be a distribution map of phase shift values brought by the sample to be analysed. In addition or alternatively, said image may be a distribution map of local chemical or biological compositions, obtained from the distribution map of phase shift values.

In an alternative, the injection zone does not extend at a side face of the planar waveguide, but is entirely surrounded by the planar waveguide material. The injection zone then preferably has four facets, among which two adjacent facets form the input facets. The method of use remains the same, except that upon injection, it is preferably ensured that the initial light beam only extends over the two input facets.

The facets formed in the planar waveguide at the injection zone and the extraction zone can each be made using at least one of the following methods:

1/ A standard manufacturing method, wherein the injection zone and/or the extraction zone is/are made by directly etching an initial silicon substrate.

2/ An alternative standard manufacturing method, wherein the injection zone and/or extraction zone is/are made by directly etching an initial substrate, where the initial substrate consists of a crystalline material transparent to the desired wavelengths and distinct from silicon, for example crystalline germanium, crystalline zinc sulphide, crystalline barium chloride, crystalline barium fluoride, etc. (which are transparent in the infrared range), or diamond (transparent in visible).

3/ A manufacturing method by moulding and stamping, wherein a crystalline silicon model is made by a method as mentioned in 1/. The model is then replicated in an auxiliary material which need not be crystalline. The auxiliary material may have better infrared transparency properties than crystalline silicon. This may include chalcogenide glasses. Alternatively, the auxiliary material may be transparent rather in the visible range, or in any other wavelength range. The replication may implement a moulding and stamping method.

4/ An alternative manufacturing method by moulding and stamping, wherein a crystalline silicon mould is directly manufactured by a method as mentioned in 1/. The optical component is made by stamping using this mould, and consists of an auxiliary material such as that mentioned in 3/ above.

The method mentioned in 1/ may involve anisotropic etching on crystal planes. Anisotropic etching comprises masking the zones to be preserved, and a bath in a solution containing an anisotropic etchant (for example potash). The etchant has preferential etching directions related to the crystal lattice.

The invention is not limited to the examples described, and covers many other alternatives, especially with different materials, different shapes and orientations of the input and output facets, different shapes of the planar waveguide and especially different orientations of its side faces, different optical paths of the object and reference beams in the planar waveguide, different shapes of the planar waveguide, etc. According to other alternatives, the analysis surface and the reference surface do not correspond to the last incidence, but to an intermediate incidence of the object beam, respectively of the reference beam, on the rear face of the planar waveguide. Preferably, in all cases, the dimensions of the analysis surface and the dimensions of the reference surface are substantially equal to the dimensions of a capture surface of the array detector. In yet other alternatives, the analysis and reference surfaces are located on the front face of the planar waveguide, on the same side as the injection zone. The method of use is the same, except that the samples are deposited on the front face of the planar waveguide. The example systems described above can be implemented with any example of an optical component. Furthermore, the various systems described above can be combined with each other.

The person skilled in the art will be easily able to dimension the optical component, to ensure that the desired inner reflections are present in the planar waveguide, especially reflections on the side faces of the latter. This dimensioning does not bring any strong stress, because a critical angle of total inner reflection in the planar waveguide, defined relative to the normal to the interface considered on the planar waveguide, generally takes a small value. This value is, for example, 17°, for an interface between silicon and air.

Advantageously, the planar waveguide can be applied against an optically reflective surface, adjoined against the rear face of the planar waveguide. Said optically reflective surface is then provided with a through opening, at an analysis surface of the planar waveguide, to be adjoined against a sample to be analysed. A region of said optically reflective surface then forms the reference sample.

The invention allows interferometric imaging, for example in the infrared range, to be carried out. It allows chemical or biological analyses of a sample to be carried out, and wide-field images to be obtained rapidly with compact instrumentation. It finds especially application in the field of health and agri-food. The invention can also be used in an endoscopy device. In this case, the optical component can be arranged inside a sealed housing.

The invention claimed is:

1. An optical component for an attenuated total reflection interferometric imaging device, including:

a planar waveguide, especially delimited by a front face, a rear face, and side faces, with the front face and the rear face parallel to each other and forming the two largest faces of the planar waveguide;

an injection zone, including two input facets formed in the planar waveguide, said input facets being obliquely tilted relative to the plane of the front and rear faces of the planar waveguide, said input facets each extending from a first side face of the planar waveguide, and said input facets being configured to separate an initial light beam into two sub-beams each deflected in a respective direction when they enter the planar waveguide; and an extraction zone, comprising two output facets formed in the planar waveguide, said output facets being obliquely tilted relative to the plane of the front and rear faces of the planar waveguide, and said output facets being configured to receive the two sub-beams and to deflect the same when they exit from the planar waveguide;

the optical component being configured so that the two sub-beams can interfere with each other after emerging out of the planar waveguide.

2. The optical component according to claim 1, wherein the two input facets form two adjacent side faces of a first pyramid.

3. The optical component according to claim 2, wherein said first pyramid is a square-base straight pyramid.

4. The optical component according to claim 1, wherein the two output facets each extend from a second side face of the planar waveguide, with the first and second side faces of the planar waveguide facing each other.

5. The optical component according to claim 4, wherein the two output facets form two adjacent side faces of a second, whole or truncated, pyramid.

6. The optical component according to claim 5, wherein said second pyramid is a square-base straight pyramid.

7. The optical component according to claim 4, having planar symmetry, relative to a plane of symmetry orthogonal to the plane of the front and rear faces of the planar waveguide, and passing through the centre of the injection zone and through the centre of the extraction zone.

8. The optical component according to claim 4, wherein the planar waveguide comprises a third side face and a fourth side face, located facing each other and each extending between the first side face receiving the injection zone and the second side face receiving the extraction zone, and tilted to each other so that a distance between the third side face and the fourth side face decreases by moving away from the injection zone and closer to the extraction zone.

9. The optical component according to claim 1, wherein the extraction zone is entirely surrounded by the material of the planar waveguide.

10. The optical component according to claim 9, wherein the extraction zone comprises at least four facets, among which the two output facets which are located facing each other.

11. The optical component according to claim 10, wherein the at least four facets are all tilted by a same angle relative to the plane of the front and rear faces of the planar waveguide.

12. The optical component according to claim 1, wherein:

the injection zone is configured to perform injection, into the planar waveguide, of light rays from a front half-space; and the extraction zone is configured to perform extraction of light rays, out of the planar waveguide, and towards said front half-space;

wherein the front half-space is delimited by a plane passing through the front face of the planar waveguide, and extends on the side opposite to the planar waveguide.

13. An imaging system, including:

an optical component according to claim 1; and an array detector, configured to acquire an interference pattern formed by at least some of the light emerging from the optical component through one of the output facets and at least some of the light emerging from the optical component through the other of the output facets.

14. The system according to claim 13, further comprising a processing module configured to:

receive as an input at least one image acquired by the array detector;

perform processing of said image so as to deduce local phase shift values therefrom; and output an image of a sample to be analysed, formed from said local phase shift values.

15. A method for using an optical component according to claim 1, comprising the following steps of:

arranging a surface of interest of a sample to be analysed, against an analysis surface formed by a first region of the rear face of the planar waveguide, and arranging a surface of interest of a reference sample against a reference surface formed by a second region of the rear face of the planar waveguide;

injecting light into the planar waveguide at the injection zone so that a part of the injected light propagates in the planar waveguide, from the injection zone to one of the output facets of the extraction zone, by passing through the analysis surface, and so that another part of the injected light propagates in the planar waveguide, from the injection zone to the other of the output facets of the extraction zone, by passing through the reference surface; and detecting an interference pattern formed by light emerging from the planar waveguide through the first output facet and the second output facet respectively.

\* \* \* \* \*

UNITED STATES PATENT AND TRADEMARK OFFICE
CERTIFICATE OF CORRECTION

| | | |
|---|---|---|
| PATENT NO. | : 11,747,134 B2 | Page 1 of 1 |
| APPLICATION NO. | : 17/645170 | |
| DATED | : September 5, 2023 | |
| INVENTOR(S) | : Cyrielle Monpeurt et al. | |

It is certified that error appears in the above-identified patent and that said Letters Patent is hereby corrected as shown below:

On the Title Page

Please insert after item (22):
-- (30) Foreign Application Priority Data
December 21, 2020 (FR) 20 13817 --

Signed and Sealed this
Twenty-fourth Day of September, 2024

Katherine Kelly Vidal
*Director of the United States Patent and Trademark Office*